United States Patent [19]

Daniels

[11] 4,090,749
[45] May 23, 1978

[54] TWIST LOCK SELF-ALIGNING BEARING SYSTEM

[75] Inventor: Nicholas R. Daniels, St. Louis, Mo.

[73] Assignee: Emerson Electric Co., St. Louis, Mo.

[21] Appl. No.: 747,867

[22] Filed: Dec. 6, 1976

[51] Int. Cl.² .......... F16C 33/66; F16C 23/00
[52] U.S. Cl. .......................... 308/132; 308/72
[58] Field of Search ............ 308/27, 29, 72, 78, 308/87 R, 121, 194, 126, 132, 238, 240, 125, 131

[56] References Cited

U.S. PATENT DOCUMENTS

| 3,423,138 | 1/1969 | Hardy | 308/132 |
| 3,966,278 | 6/1976 | Lewis | 308/72 |
| 4,014,596 | 3/1977 | Kazama | 308/72 |

FOREIGN PATENT DOCUMENTS 1,171,829  1/1959  France .................. 308/132

*Primary Examiner*—Trygve M. Blix
*Assistant Examiner*—Charles E. Frankfort
*Attorney, Agent, or Firm*—Polster, Polster and Lucchesi

[57] ABSTRACT

A self-aligning bearing is held against a plurality of seats by a spring retainer having an opening in it, the annular edge of the opening in the spring retainer forming a second seat for the bearing. The retainer has a plurality of tabs formed along its periphery. A plurality of receptacles are provided, each receptacle including a closed bottom, open mouth channel which is sized to receive the tabs. The retainer is positioned by flexing the tabs and rotating the retainer into the channel. A unique lubricating system constructed from oil retentive material is provided for lubriating the bearing.

10 Claims, 10 Drawing Figures

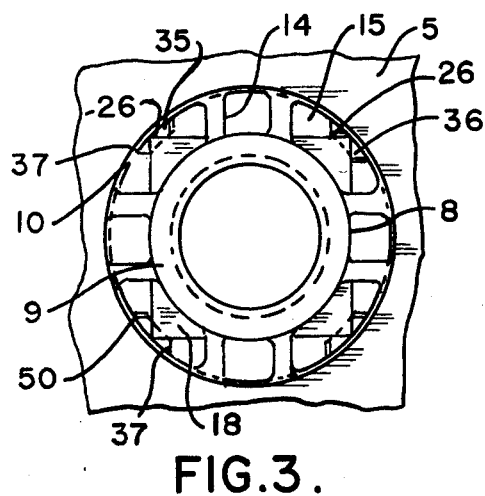
FIG.3.
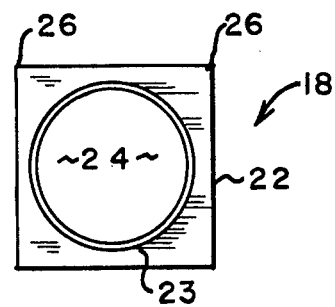
FIG.4.
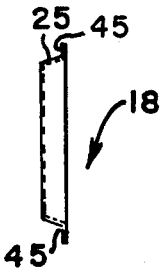
FIG.5.
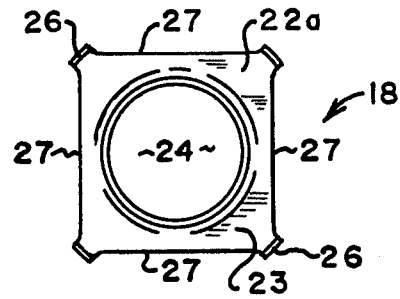
FIG.6.
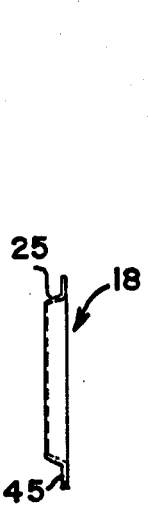
FIG.7.
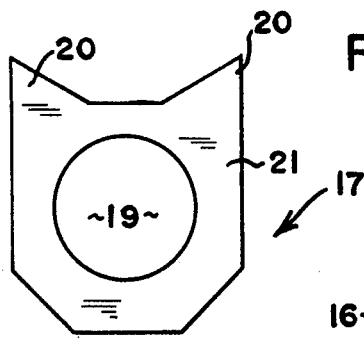
FIG.9.
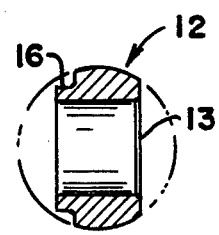
FIG.8.
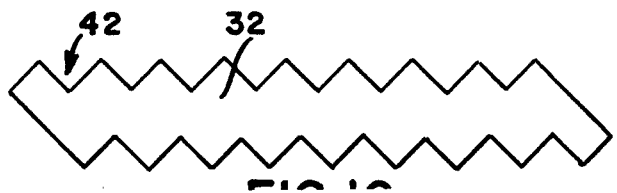

TWIST LOCK SELF-ALIGNING BEARING SYSTEM

BACKGROUND OF THE INVENTION

This invention relates to systems of the self-aligning bearing type. While the invention is described with particular reference to its application in dynamoelectric machines, those skilled in the art will recognize the wider applicability of the inventive principles disclosed hereinafter.

A number of self-aligning bearing assemblies are known in the art. One particular useful assembly is shown and described in patent to Lewis, U.S. Pat. No. 3,996,278, assigned to the assignee of the present invention. While the Lewis invention works well for its intended purpose, I have found that improvements in bearing performance can be obtained, for example, if three or four point contact between the spring retaining means and the associated structure for holding the retaining means is utilized. In addition, a positive stop in the form of a closed sided abutment surface or receptacle ensures positive seating of the retainer in the receptacle and eases or eliminates production problems encountered with a twist lock system that may be approached from either a counter-clockwise or clockwise direction. The use of a multiple point retainer simplifies retainer manufacture and reduces scrap material. In addition, an improved lubricant retention system includes a novel shaped wick and packing system for the bearing assembly.

One of the objects of this invention is to provide a low cost, self-aligning bearing assembly.

Another object of this invention is to provide a self-aligning bearing assembly for a dynamoelectric machine.

Another object of this invention is to provide a bearing system having an improved packing arrangement for a bearing assembly.

Other objects of this invention will be apparent to those skilled in the art in light of the following description and accompanying drawings.

SUMMARY OF THE INVENTION

In accordance with this invention, generally stated, a self-aligning twist lock bearing assembly is provided which exhibits simplified structure and ease of installation. Preferably, the bearing assembly is used in a dynamoelectric machine which includes a rotor assembly supported at each end by an end shield, at least one of which houses the bearing assembly of this invention. That end shield includes a hub having first and second spaced walls. The first wall has an opening in it for receiving a bearing means of the bearing assembly. The second wall has a plurality of receptacle means integrally formed with it, the receptacle means including an open mouth, closed sided channel. A retainer has a central opening in it which receives the bearing means. The retainer has a plurality of tabs along its periphery, sized for reception in the channels. The retainer holds the bearing means and a wick of an associated lubrication supply reservoir means in position by flexing the tabs and rotating the tabs within the channels until the tabs abut the closed sides of the channels.

BRIEF DESCRIPTION OF THE DRAWINGS

In the drawings,

FIG. 3 is an enlarged view, partly broken away, of the hub structure shown in FIG. 1;

FIG. 4 is a top plan view of one illustrative embodiment of retainer means utilized in conjunction with the bearing assembly of FIG. 1;

FIG. 5 is a view in side elevation of the retainer means shown in FIG. 4;

FIG. 6 is a top plan view of a second illustrative embodiment of retainer means of this invention;

FIG. 7 is a view in side elevation of the retainer means shown in FIG. 6;

FIG. 8 is an enlarged sectional view of the bearing means utilized in conjunction with the dynamoelectric machine of FIG. 1;

FIG. 9 is a top plan view of the wick used in the bearing assembly of this invention; and FIG. 10 is a top plan view of a packing material used with the bearing assembly of this invention.

DESCRIPTION OF THE PREFERRED EMBODIMENT

Figure 1:
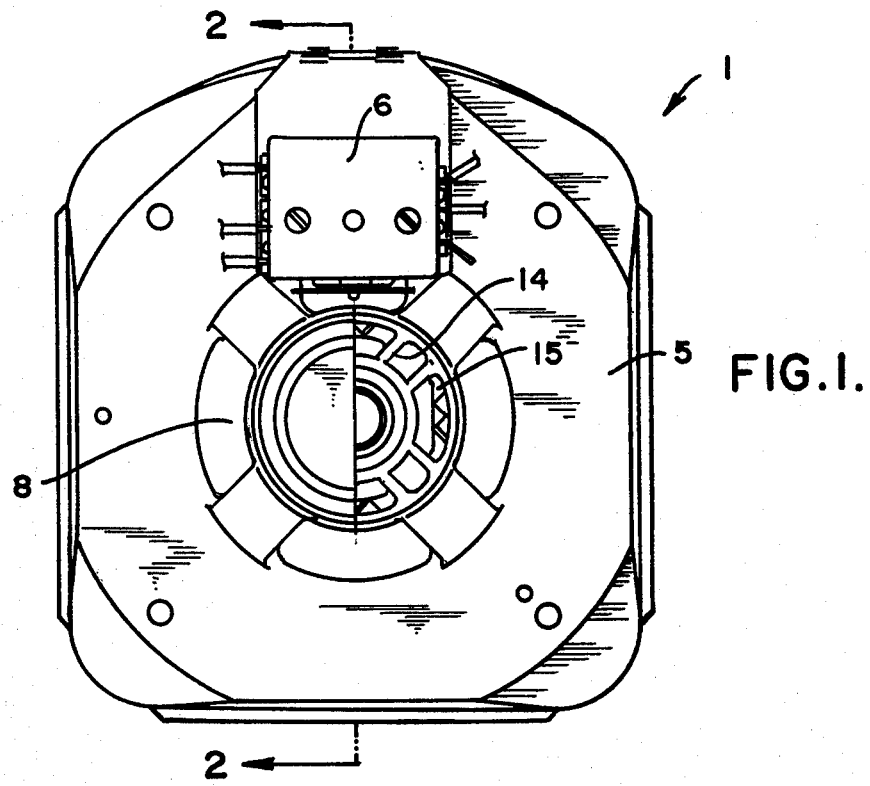
FIG. 1 is a view in end elevation, partly broken away, of a dynamoelectric machine employing the bearing system of this invention.

Referring now to FIG. 1, reference numeral 1 indicates an electric motor which includes a stator assembly 2, and a rotor assembly 3.

The rotor 3 is mounted for rotation on a shaft 4 supported at opposed ends of the shaft 4 by a pair of end shields 5, only one of which is shown in the drawings, that end shield housing a bearing assembly 40. The particular motor 1 includes a switch structure 6 and protector 7 which conventionally are utilized with dynamoelectric machines of the type shown for interconnecting electrical energy to the stator assembly of the motor, and to protect the windings thereof against overload conditions.

The end shield 5 includes a central hub portion 8 defined by a first inner wall 9 and a second outer wall 10 generally concentrically arranged with respect to one another. The wall 9 delimits a central circular opening along a tapered surface 11 which defines an annular seat for receiving a portion of a bearing means 12. In the embodiment illustrated, the bearing means 12 has a spherical or oblong shape having a bore 13 sized to receive one end of the shaft 4. As is best seen in FIGS. 1 and 3, the wall 9 is connected to the wall 10 along a plurality of legs 14, an area 15 between the legs 14 being open axially along the hub 8. Wall 9 may have a plurality of projections extending radially inwardly of the wall, sized for reception in a plurality of grooves 16 formed in the outer surface of the bearing means 12. The grooves 16 and corresponding projections of the wall 9 aid in locating the bearing within the opening defined by the wall 9.

Figure 2:
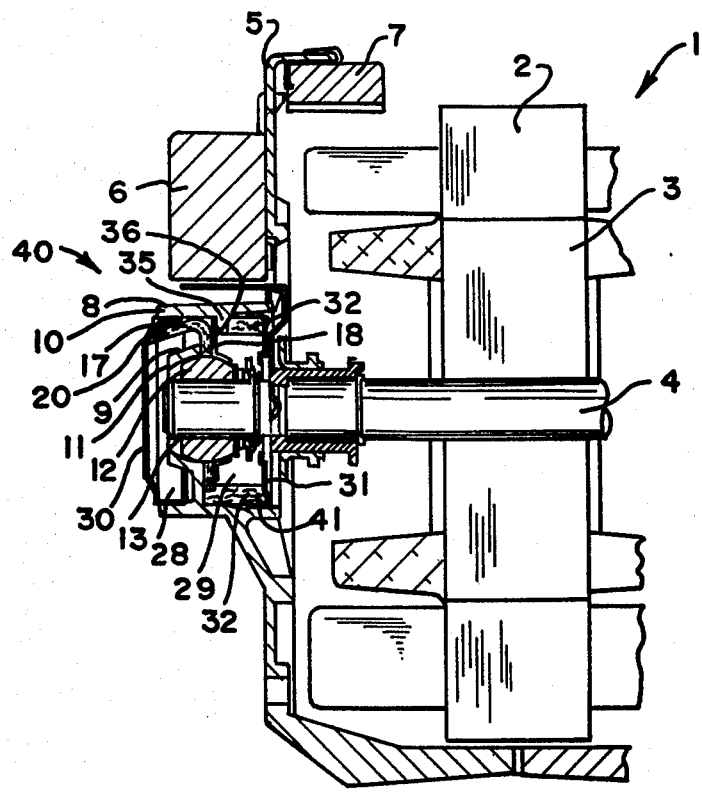
FIG. 2 is a sectional view, partly broken away, taken along the line 2—2 of FIG. 1.

A wick 17, best seen in FIGS. 2 and 9, forms a first part of a lubrication system 41 for the bearing assembly 40. The wick 17 is mounted between the wall 9 and a retaining means 18. Wick 17 is an elongated structure having a central opening 19 through it. The opening 19 is sized to receive the bearing means 12 and abut it circumferentially in the operative position of the bearing means. The wick 17 has a pair of ears 20 projecting outwardly from a main surface area 21. The ears 20 extend through the openings 15 between the walls 9 and 10. The wick 17 is held in position about the bearing by the retaining means 18.

One illustrative embodiment of retaining means 18 is shown in FIG. 4. As there illustrated, a retainer 22 has a square surface 23 having a central opening 24 in it. The opening 24 is defined in part by a lip 25, best seen in FIG. 5, which is tapered to receive a portion of the spherical bearing means 12 in the intermounted position of the retainer 22. The corners of the retainer 22 delimit tabs 26 which are used to hold the retaining means 18 in position, as later described. A second illustrative embodiment of the retaining means 18 is shown in FIG. 6. There a retainer 22a is similar to the retainer 22 except that each of the edges of opposed sides 27 are cut away to better define the tabs 26 and to increase the contact or engagement area between the tabs 26 and respective ones of a plurality of receptacle means 35 in the operative position of the retainer.

As observable in FIG. 2, the hub 8 structure described delimits an outer bearing chamber 28 and an inner bearing chamber 29. The openings 15 permit communication between the chambers 28 and 29, as do the ears 20 of the wick 17. The chamber 28 is closed by an end cap 30, while the chamber 29 is closed by a bearing cap 31. Caps 30 and 31 are press fit within the axial opening defined by the wall 10 and are frictionally engaged thereby.

Suitable packing 32 is positioned on the chamber 29 side of the bearing means 12, which communicates with the wick 17 along the sides 27 of the retainers 22 and 22a. The packing 32 has a plurality of cut-outs 42 along the opposed edges of the packing, giving the packing 32 a saw tooth appearance. The teeth formed in the edges ensure excellent contact between packing and wick. The packing 32 and wick 17 may be constructed from any suitable material and preferably both are formed from a felt-like material commonly used in the art. The packing 32 acts as a lubricant reservoir for the bearing means 12. That is to say, the motor may be constructed in accordance with conventional constructional techniques and the packing and wick charged with lubricant by applying the lubricant to the ears 20 of the wick 17. Application of the lubricant to the wick 17 conveys the lubricant both to the bearing means 12 and to the packing 32, until the entire lubrication system 41 is charged.

The wall 10 has a plurality of the receptacle means 35 integrally formed with it. Receptacle means 35 includes an abutment surface 36 having a side 37 arranged so that the side 37 defines a stop for the receptacle 35. Preferably, the abutment surface 36 has a lead chamfer 50 formed in it, which eases installation of the retaining means 18 during bearing assembly with minimum deflection of the retaining means.

In assembling the bearing means 12 and retaining means 18, the bearing is placed upon the seat defined by the wall 9 and the wick 17 is placed in position. Retaining means 18 is then placed over the bearing with its lips 25 engaging the spherical surface of the bearing means 12, the tabs 26 being located approximately 30 degrees from the position shown in FIG. 3. That is to say, the tabs 26 are in a position in which they are clear of the receptacle means 35. The retaining means 18 and in particular the tabs 26 thereof are then pressed axially toward the bearing means 12 and the retainer 18 is rotated to the position shown in FIG. 3. As indicated, a lead chamfer 50 may be used in conjunction with the receptacle means 35 as an assembly aid, if desired. In that position, the edges of tabs 26 abut the side 37, thereby positively stopping and preventing further rotational movement of the retaining means 18, while an area 45 engages abutment surface 36. Retaining means 18 preferably is constructed from a suitable spring-like material and interlocking the tabs and receptacle means hold the retaining means 18 in stress condition.

Numerous variations, within the scope of the appended claims, will be apparent to those skilled in the art in light of the foregoing description and accompanying drawings. Thus, while a generally square or rectangular retaining means 18 was described, other shapes are compatible with the broader aspects of this invention. Likewise, packing means 32 is described as having a saw tooth edge. Otherwise scalloped edge effects may be used, if desired. The design and design silhouette of various conventional components of the motor 1 may be varied in other embodiments of this invention. These variations are merely illustrative.

Having thus described the invention, what is claimed and desired to be secured by Letters Patent is:

1. A twist lock, self-aligning bearing assembly, comprising:
   a hub, said hub having an axial opening in it defined by a first wall, said hub having a second wall spaced from and outboard of said first wall;
   bearing means mounted in the axial opening;
   wick means for providing lubrication to said bearing means positioned about said bearing means, said wick means having a part extending between said first wall and said second wall and directed axially outwardly of said hub;
   receptacle means formed along said second wall, said receptacle means extending radially inwardly of said hub, said receptacle means including an abutment surface spaced axially from said first wall, and an open mouth channel having at least one closed side, said abutment surface bounding a portion of said channel; and
   retainer means having a central portion, an aperture in said central portion defined by an annular seat in engagement with said bearing means, said retainer means defining tabs on the outer boundary thereof, said tabs being sized for reception in the channel of said receptacle means and being insertable therein by rotational movement of said retainer means, said retainer means being deflected for insertion in said channel along said tabs, said tabs being held against said abutment surface in stress condition, said retainer being rotatable in the channel of said receptacle means until said tabs meet the closed side of said channel.

2. The bearing assembly of claim 1 wherein said bearing means has a plurality of grooves formed in it, said first wall having a plurality of protrusions formed in it, said protrusions being insertable in the grooves for positioning said bearing means.

3. The bearing assembly of claim 2 wherein said bearing means is spherical.

4. The bearing assembly of claim 3 further including packing means in fluid communication with said wick means.

5. The bearing assembly of claim 4 wherein said packing means has an irregular edge.

6. The bearing assembly of claim 4 wherein said retainer means is constructed from spring steel.

7. The bearing assembly of claim 1 wherein the abutment surface of said receptacle means has a lead chamfer formed in it.

8. A twist lock, self-aligning bearing assembly, comprising:
- a hub, said hub including a first wall, a second wall concentric with said first wall, said first wall defining an axial opening through said hub, said hub having a passage in it between said first wall and said second wall;
- bearing means mounted in the axial opening;
- lubrication system means for providing lubrication to said bearing means, said lubrication system means including a part extending along the passage between said first wall and said second wall;
- receptacle means formed along said second wall and extending inwardly of said hub, said receptacle means including an abutment surface spaced axially from said first wall and an open mouth channel having at least one closed side, said abutment surface bounding a portion of said channel; and
- retainer means having a central portion, an aperture in said central portion defined by an annular seat in engagement with said bearing means, said retainer means defining tabs on the outer boundary thereof, said tabs being sized for reception in the channel of said receptacle means and being insertable therein by rotational movement of said retainer means, at least the tabs of said retainer means being deflected for inserting the tabs in said receptacle means, said tabs being held against said abutment suface in stress condition after insertion, the closed side of said channel delimiting a stop for tab rotation during such insertion.

9. The bearing assembly of claim 8 wherein said lubrication system means comprises wick means positioned about said bearing means, said wick means forming the part of said lubrication system means extending along the passage between said first wall and said second wall.

10. The bearing assembly of claim 9 further including packing means in fluid communication with said wick means, said packing means including an elongated structure having a serrated side along at least one edge thereof, said structure being formed in a cylindrical structure having said serrated side along an end of said cylindrical structure, the serration of said side being directed axially outward of said hub.

* * * * *